No. 876,753. PATENTED JAN. 14, 1908.
W. WANEE.
HAND TRUCK.
APPLICATION FILED SEPT. 18, 1907.
2 SHEETS—SHEET 1.
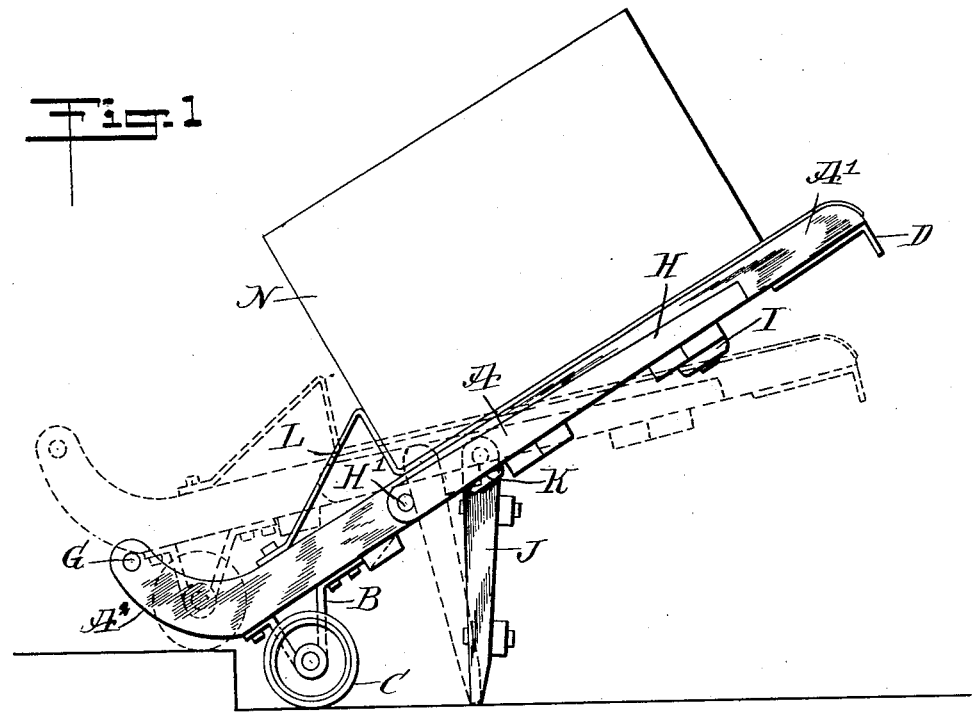
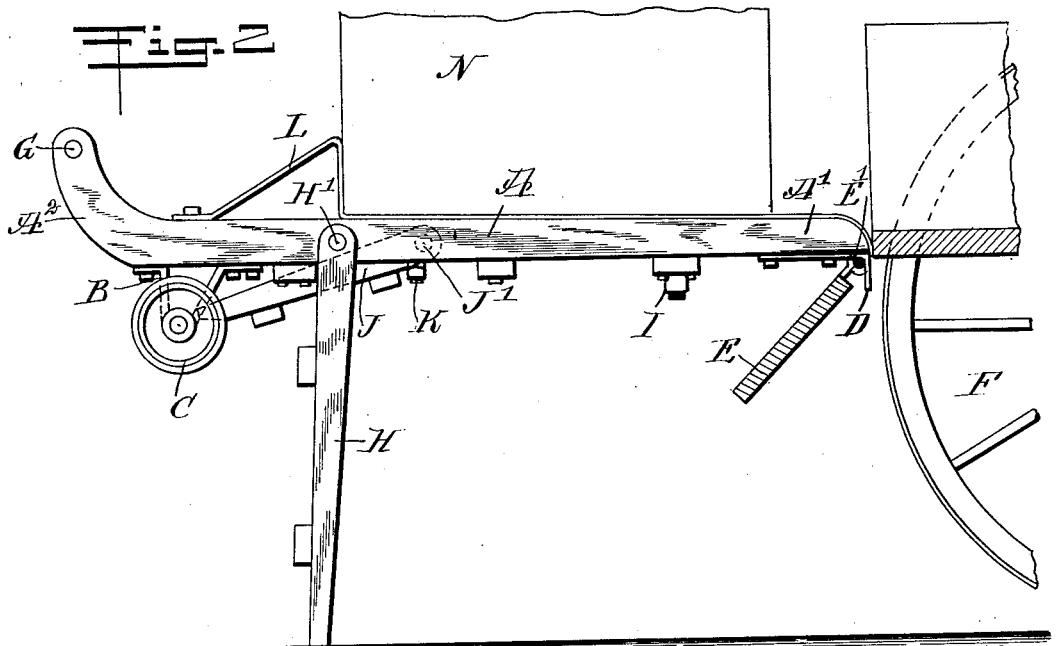
WITNESSES
F. D. Sweet.
Rev. G. Hoskin
INVENTOR
William Wanee
BY Munn & Co.
ATTORNEYS

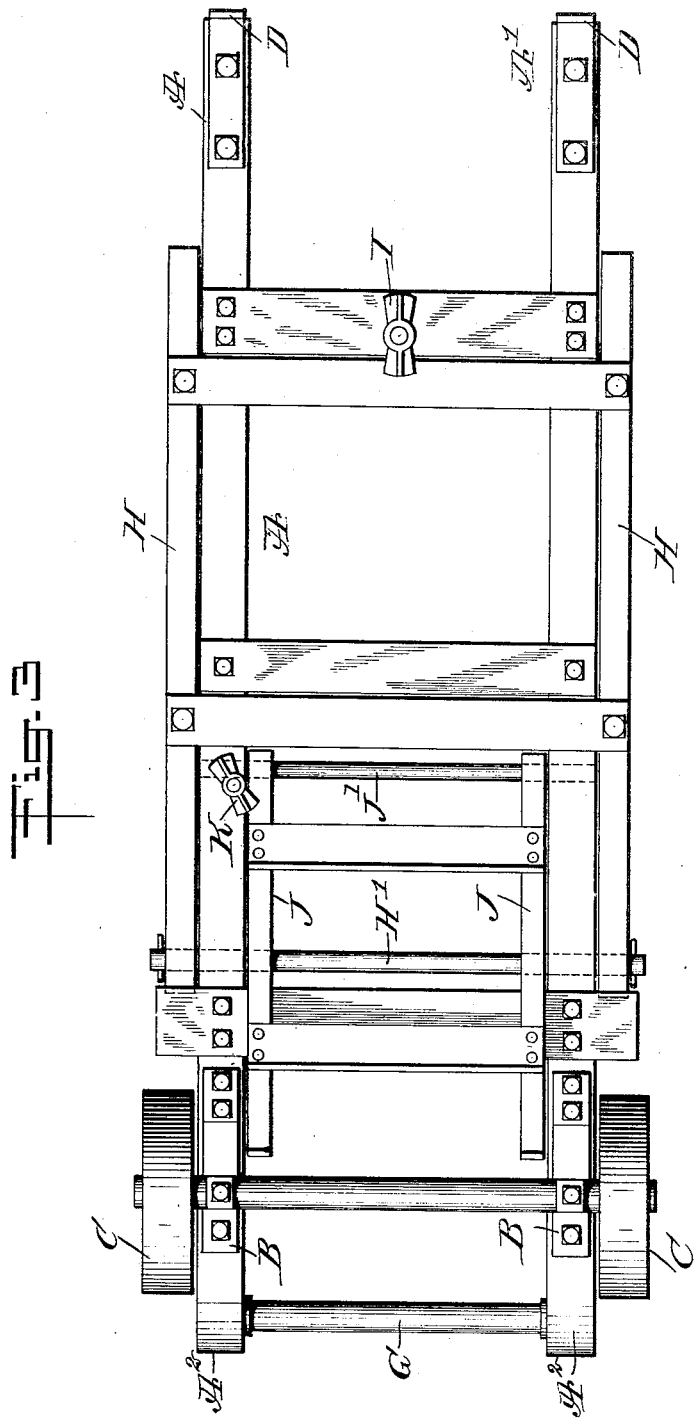

UNITED STATES PATENT OFFICE.

WILLIAM WANEE, OF RED BLUFF, CALIFORNIA.

HAND-TRUCK.

No. 876,753.

Specification of Letters Patent.

Patented Jan. 14, 1908.

Application filed September 18, 1907. Serial No. 393,431.

*To all whom it may concern:*

Be it known that I, WILLIAM WANEE, a citizen of the United States, and a resident of Red Bluff, in the county of Tehama and State of California, have invented a new and Improved Hand-Truck, of which the following is a full, clear, and exact description.

The object of the invention is to provide a new and improved hand truck, more especially designed for the use of expressmen, porters and other persons, and arranged to permit easy and convenient loading of the trunk, box or the like onto a wagon or a platform, and to allow of raising the truck up a step or two onto a sidewalk, for instance.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement arranged for raising the truck onto a sidewalk; Fig. 2 is a like view of the same in position on a wagon, the latter being shown in section, and Fig. 3 is an inverted plan view of the improvement and showing both legs locked in a folded position.

The truck frame A of the hand truck is provided with the usual bearings B for the truck wheel C, and on the rear or handle end A' of the truck frame A are arranged hooks D for hooking onto the pintle or pivot E' of the end gate E of a wagon or like terminal F, as plainly indicated in Fig. 2. The shoe or curved forward end A² of the truck A is provided with a handle G adapted to be taken hold of by the expressman, porter or other person manipulating the truck, to swing the truck frame A into a horizontal position at the time the hooks D engage the pintle E', as plainly indicated in Fig. 2. In order to sustain the truck frame A in this horizontal position, the following arrangement is made: On the side arms of the truck frame A is pivoted a leg H, the pivot H' being arranged near the bearings B for the wheel C to allow of holding the leg H on the under side of the truck frame A and in a rearward direction, the said leg H when folded being locked in place by a suitable button I, or a like fastening device held on the truck frame A. When the leg H is unlocked and the truck frame A is swung into the horizontal position above referred to and shown in Fig. 2, then the leg H can be swung downward in contact with the ground, to support the truck frame A in a horizontal position, thus allowing a trunk or other article to be readily pushed from the truck frame onto the bed of the vehicle F or back from the latter onto the truck frame. On the side arms of the truck frame A is also pivoted at J' a leg J, somewhat shorter than the leg H and adapted to be folded upon the truck frame A in a forward direction, as plainly indicated in Fig. 2. A button K serves to lock the short leg J in position on the truck frame A.

On the top of the truck frame A is arranged a retaining device L, in the form of angular lugs secured to the side arms of the truck frame A for holding a trunk, box or like article N in place on the truck frame while moving the hand truck from one place to another. Now when it is desired to move the truck and its load up a step or two, then the leg J is unlocked and swung into a vertical position, as indicated in Fig. 1, to allow of using the leg J as a fulcrum on which to swing the truck frame A by bearing down on the handle A' thereof, so that the front end is raised and the wheels C are lifted from the ground a desired height, to push the wheels of the truck forward, with a view to engage the wheels C with a sidewalk previous to pushing the truck end on the sidewalk.

As indicated in the drawings, the long leg H is fulcrumed to the outside of the side bars of the truck frame A, and is capable of folding rearwardly onto the truck frame while the short leg J is fulcrumed on the inside of the side bars of the truck frame, and is capable of being folded forwardly onto the truck frame. Both legs H and J are adapted to be locked in a folded position by the use of the buttons I and K, to permit using the truck the same as any ordinary hand truck. When it is desired to raise the truck, however, from the ground to the sidewalk, then use is made of the short leg J, and when it is desired to conveniently load a trunk, box or the like onto the vehicle F, then use is made of the leg H as above described and illustrated in Fig. 2.

It is understood that the hooks D can be readily hooked onto the pintle E', and then the operator by taking hold of the handle G can swing the truck forward with its load, until the truck assumes an approximately horizontal position, at which time the unlocked leg H, swings downward in engagement with the ground, to sustain the truck frame in a horizontal position. When this has been done the manipulator of the truck can readily push the trunk, box or like article N from the truck onto the vehicle F without any assistance whatever, it being understood that by the use of the device a single truckman can conveniently handle a trunk or other heavy piece of luggage, box or the like.

Having thus described my invention, I claim as new and desire to secure by Letters Patent:

1. A hand truck having a truck frame provided with a pivoted short leg and a pivoted long leg, of which the short leg is used as a fulcrum for swinging the wheeled end of the truck off the ground, and the long leg is used for supporting the truck in an approximately horizontal position at the time the truck handles embrace a support on the wagon, and the wheeled end of the truck has been lifted up by the truckman.

2. A hand truck comprising a truck frame, terminating at the rear or handle ends in hooks for engagement with a support on a wagon, the forward end of the said frame having a handle for swinging the truck up on the said supported hooks as a fulcrum, wheels journaled on the said forward end of the truck frame, and a leg pivoted on the said truck frame near the forward end thereof.

3. A hand truck, comprising a truck frame terminating at the rear or handle ends in hooks for engagement with a support on a wagon, the forward end of the said frame having a handle for swinging the truck up on the said supported hooks as a fulcrum, wheels journaled on the said forward end of the truck frame, a leg pivoted on the said truck frame near the forward end thereof, and retaining lugs at or near the forward end of the truck frame.

4. The combination with a wagon having a hinged end gate, of a hand truck having a truck frame provided with a handled shoe at the front and with hooks at the rear handled end of the frame, the said hooks being adapted to engage the pintle of the hinge of the said end gate, wheels journaled on the said truck frame, and a leg pivoted on the said truck frame near the said wheels.

5. The combination with a wagon having a hinged end gate, of a hand truck having a truck frame provided with a handled shoe at the front and with hooks at the rear handled end of the frame, the said hooks being adapted to engage the pintle of the hinge of the said end gate, wheels journaled on the said truck frame, a leg pivoted on the said truck frame near the said wheels, and retaining lugs on the top of the said truck frame adjacent to the fulcrum of the said leg.

6. A hand truck having a truck frame provided with a pivoted short leg and a pivoted long leg, of which the short leg is used as a fulcrum for swinging the wheeled end of the truck off the ground, and the long leg is used for supporting the truck in an approximately horizontal position at the time the truck handles embrace a support on the wagon and the wheeled end of the truck has been lifted up by the truckman, the said legs folding upon the said truck frame in opposite directions, and means on the truck frame for locking the said legs in a folded position to the said truck frame.

In testimony whereof I have signed my name to this specification in the presence of two subscribing witnesses.

WILLIAM WANEE.

Witnesses:
H. S. GANS,
F. L. WALBRIDGE.